Patented Oct. 28, 1952

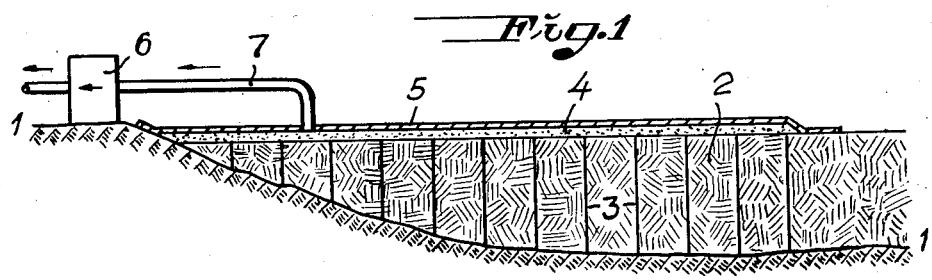
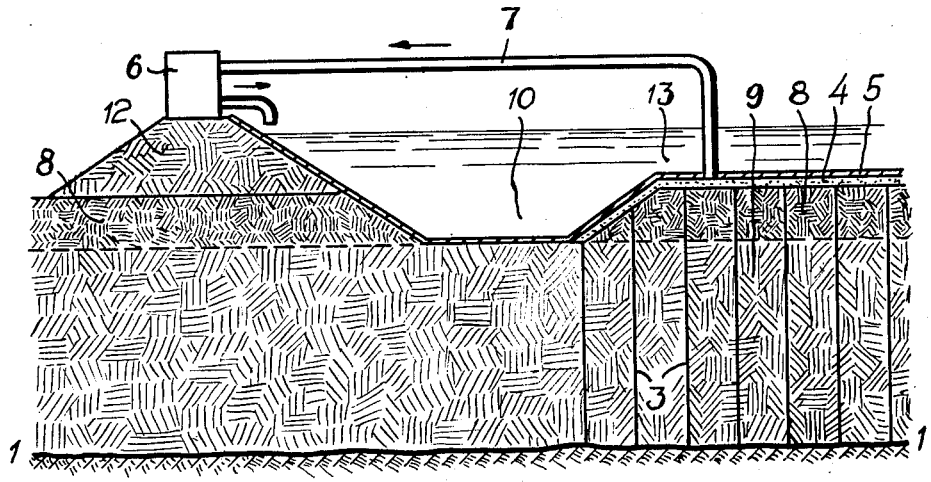

2,615,307

UNITED STATES PATENT OFFICE 2,615,307

METHOD OF CONSOLIDATING SOILS

Walter Kjellman, Stockholm, Sweden

Application April 29, 1948, Serial No. 23,977
In Sweden May 6, 1947

2 Claims. (Cl. 61—11)

My invention relates to a method for consolidating and/or stabilizing soils. The object of my method which can be used under varying conditions is to save time and money as compared with previous methods.

It is already known that the consolidation of a fine-grained soil subjected to a load can be accelerated by means of vertical drains of sand or card-board, which facilitate the escape of pore water from the soil. Sometimes this process is made still more effective by means of a temporary surcharge of gravel applied upon the drained soil. According to the present invention the atmospheric pressure is used instead of gravel as a temporary surcharge.

The invention is described below with reference to some examples of application illustrated in the attached drawing, the invention being of course not limited to these examples.

Figs. 1 and 2 are vertical sections through a soil including two different embodiments of my invention represented in a diagrammatic manner.

In Fig. 1, line 1—1 is the tight firm ground, 2 the soil layer to be treated, 3 the drains and 4 a filter covering the surface of the drained soil. The drains 3 may be of any suitable construction adapted to permit water to flow upwards to the surface of the soil. The filter 4 is covered with a tight membrane 5, the edge of which is tightened to the ground outside the filter. From a vacuum pump 6 a pipe 7 is drawn through the membrane by means of a tight connection.

By pumping, the pressure of the air and the water in the filter and the drains is lowered by say 12.5 lbs. per sq. inch. Consequently, thanks to the atmospheric pressure acting downwards on the membrane, the drained soil starts to consolidate as if it had been loaded with a layer of gravel, weighing 12.5 lbs. per sq. inch, that is being about 18 feet thick. As the soil consolidates, its shear strength increases considerably. The rate of consolidation depends on the properties of the soil and the radius and spacing of the drains. Normally the pumping will have to go on for some weeks or months.

After the desired degree of consolidation has been reached, the pumping is stopped and the membrane removed. Now the soil swells a little, but the main part of the consolidation and the shear strength, attained by the treatment, will remain.

In cases where the permanent load is considerable, it is advisable to apply it before the pumping starts, so that it combines with the atmospheric pressure in consolidating the soil. The permanent load—for instance a road embankment—may be placed upon the membrane or, preferably, between the filter and the membrane.

The new method can be used in soils of clay, silt, mud, peat, etc. in the construction of streets, roads, quays and airfields, and also when digging canals and shafts. The purpose is firstly to prevent earth slides and ground ruptures by increasing the bearing capacity of the soil, and secondly to render the settlements harmless by forcing them to completion, before the concrete constructions are made.

Used as a temporary surcharge, the atmospheric pressure is normally cheaper and more effective than the thickest gravel layer that is practicable. Furthermore, thanks to its nature it cannot cause earth slides or ground ruptures, as a thick gravel layer might do under certain conditions.

The membrane can be produced on the site by pouring a thin layer of warm asphalt from a tank car furnished with a spreader, or by spray painting, or by puddling a layer of clay, or by letting a clay suspension sedimentate. Occasionally a layer of ice or frost may serve as a membrane. Normally, however, the best way will be to make the membrane from long strips of sheet-metal, sheet-rubber or sheet-plastic or else of impregnated cloth, paper or cardboard. The strips may be delivered from the factory to the site rolled on drums. They may be joined together by gluing, welding, soldering, folding etc. or perhaps simply by overlapping and loading with sand. According to investigations already made a good and cheap membrane is produced by electrically welding together strips of sheet-plastic (polyvinyl chloride) having a thickness of about 0.01 inch.

The filter 4 may consist of a layer of sand, gravel or shingle or a combination of such layers. Also a layer of twigs, straw etc., or mats made from such materials may be used. The capacity of the filter to let through water can be increased by means of pipes of sheet-metal, wood or brick.

If the ground contains a layer of sand or gravel, penetrated or reached by the drains, the pump can suck from this layer, and then the filter may be omitted. A still greater effect can be attained by using a deep-well pump working on the level of the layer. If the layer bears much water, it is necessary anyway to prevent this water from entering the drains.

The novel method can be used also in soils with such a permeability that neither filter nor drains are needed. Thus it can serve for dewatering in place of peat for fuel. Further it can be used for compressing fills of gravels, stones etc.

Attention must be paid to the tightening of the membrane 5 to the ground outside the area to be treated. Is the ground here fine-pored, the membrane need only be extended a short distance from the border of the filter 4, as shown in Fig. 1; the capillary force prevents air from being sucked into the soil, and the pore water moves extremely slowly only. The extended portions of the membrane may be loaded by a line of gravel or the like to secure tight engagement with the surface of the ground. If on the other hand the soil is coarse-pored, the membrane must either be extended downwards on the slope of a ditch to the firm ground, or else be tightened to a sheet-piling driven to the firm ground.

In practice the soil normally consists, as shown in Fig. 2, of an upper thin coarse-pored layer 8—a dry crust with cracks—and a lower thick fine-pored layer 9. Then a ditch 10 may be dug through the upper layer, and the membrane 5 is extended down into the ditch, where it is tightened to the lower layer. This tightening can be improved by loading the membrane with water 13 or sand. As it is much easier to tighten against water than against air, it may be worth while to keep the whole membrane under water. This can be done, as shown in Fig. 2, by using the earth excavated from the ditch 10 to build a small dam 12 along the ditch, and extending the membrane 5 up to the crest of this dam. The water 13 above the membrane 5 is valuable also as a load acting on the drained soil. The same structure may be used at the right-hand end (not shown) of the soil to be treated.

What I claim is:
1. A drainage system for removing water from subterranean soil levels including a filter covering the entire surface of the soil to be treated, an air tight membrane covering said filter, a plurality of vertical drains disposed beneath said filter and communicating therewith, and a pump communicating through said membrane with said filter above the soil to be treated so as to allow water to flow upward to the surface of the soil and reduce the pressure on the lower side of the membrane below atmospheric pressure to consolidate the soil.

2. The method of consolidating soils consisting in forming substantially vertical drains in the soil, covering the vertical drains and the entire surface of the soil to be treated with a layer of filter material pervious to water, covering said filter layer with a membrane layer of air tight material, and communicating the filter material with a pump for reducing the pressure on the lower side of the membrane layer below atmospheric pressure.

WALTER KJELLMAN.

REFERENCES CITED

The following references are of record in the file of this patent:

UNITED STATES PATENTS

| Number | Name | Date |
|---|---|---|
| 2,136,151 | Parish | Nov. 8, 1938 |

FOREIGN PATENTS

| Number | Country | Date |
|---|---|---|
| 511,013 | Germany | 1930 |
| 515,595 | Germany | 1931 |